United States Patent
Loewen et al.

(10) Patent No.: US 10,409,737 B2
(45) Date of Patent: Sep. 10, 2019

(54) APPARATUS, SYSTEM, AND METHOD FOR POSITIONALLY AWARE DEVICE MANAGEMENT BUS ADDRESS ASSIGNMENT

(71) Applicant: INTEL CORPORATION, Santa Clara, CA (US)

(72) Inventors: Myron D. Loewen, Berthoud, CO (US); Andrew W. Morning-Smith, Vancouver (CA); Anthony M. Constantine, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 146 days.

(21) Appl. No.: 15/700,031

(22) Filed: Sep. 8, 2017

(65) Prior Publication Data
US 2018/0357187 A1    Dec. 13, 2018

Related U.S. Application Data

(60) Provisional application No. 62/516,664, filed on Jun. 7, 2017.

(51) Int. Cl.
*H04L 12/40*    (2006.01)
*G06F 13/16*    (2006.01)
(Continued)

(52) U.S. Cl.
CPC ...... *G06F 13/1631* (2013.01); *G06F 13/4081* (2013.01); *H04L 12/40169* (2013.01);
(Continued)

(58) Field of Classification Search
None
See application file for complete search history.

(56) References Cited

U.S. PATENT DOCUMENTS 4,701,878 A * 10/1987 Gunkel ............... G06F 12/0661
                                                  710/104
5,148,389 A *  9/1992 Hughes ............... G06F 12/0676
                                                  710/104
(Continued)

FOREIGN PATENT DOCUMENTS

WO        02/17088        2/2002

OTHER PUBLICATIONS

Fan, R., "SMBus Quick Start Guide", Application Note, Doc. No. AN4471, Rev. 1, © Freescale Semiconductor, Inc., Aug. 2012, 16 pp.

(Continued)

*Primary Examiner* — Elias Mamo
(74) *Attorney, Agent, or Firm* — Konrad Raynes Davda & Victor LLP; David W. Victor

(57) ABSTRACT

Provided are apparatus, system, and method for positionally aware device management bus address assignment. A presence of a plurality of storage devices is detected on a bus. One of the storage devices detected on the bus is selected. A get identifier command is sent on the bus to all of the storage devices that is only responded to by the selected storage device. A unique identifier is received from the selected storage device over the bus. An address for the selected storage device is assigned and an entry is added to the address mapping to indicate the unique identifier, the assigned address, and a physical location indicator for the selected storage device.

22 Claims, 4 Drawing Sheets

(51) Int. Cl.
*G06F 13/40* (2006.01)
*G06F 13/20* (2006.01)

(52) U.S. Cl.
CPC ...... *G06F 13/20* (2013.01); *G06F 2213/0026* (2013.01); *G06F 2213/0052* (2013.01)

(56) References Cited

U.S. PATENT DOCUMENTS

| | | | | |
|---|---|---|---|---|
| 5,175,822 | A * | 12/1992 | Dixon | G06F 12/0676 710/9 |
| 5,317,693 | A * | 5/1994 | Cuenod | G06F 9/4411 370/257 |
| 6,604,207 | B2 * | 8/2003 | Sheikh | G06F 1/20 714/1 |
| 6,629,172 | B1 * | 9/2003 | Andersson | G06F 13/4291 710/104 |
| 8,779,922 | B2 * | 7/2014 | Groth | G06Q 10/087 340/568.2 |
| 2004/0250002 | A1 | 12/2004 | Hellberg | |
| 2005/0125575 | A1 * | 6/2005 | Alappat | H04L 29/1232 710/41 |
| 2008/0215765 | A1 | 9/2008 | Butler et al. | |
| 2009/0251960 | A1 | 10/2009 | Schultz et al. | |
| 2018/0356872 | A1 | 12/2018 | Loewen et al. | |

OTHER PUBLICATIONS

System Management Interface Forum, Inc., "System Management Bus (SMBus) Specification", Version 3.0, Dec. 20, 2014, 85 pp.
"Power Disable Feature", Tech Brief, HGST, © Western Digital Corporation, 2016, 3 pp.
U.S. Appl. No. 15/719,539, entitled "Combining Presence Detect Pin With Device Management Bus Reset and Power Disable", invented by M.D. Loewen et al., filed Sep. 29, 2017, 23 pp. [77.398 (Appln)].
European Search Report for EP Application No. 18171120, dated Mar. 27, 2019, 9 pp. [77.398EP (EPSR)].
usb.org, "Universal Serial Bus Specification Revision 2.0, Chapter 7: Electrical", [online], Apr. 27, 2000, [Retrieved on Dec. 7, 2015], Retrieved from the Internet at <URL: http://www.usb.org/developers/docs/usb20_docs/#usb20spec>, 74 pp.
Office Action 1 for U.S. Appl. No. 15/719,539, dated Dec. 14, 2018, 15 pp. [77.398 (OA1)].

* cited by examiner

Address Mapping Entry

APPARATUS, SYSTEM, AND METHOD FOR POSITIONALLY AWARE DEVICE MANAGEMENT BUS ADDRESS ASSIGNMENT

TECHNICAL FIELD

Embodiments described herein generally relate apparatus, system, and method for positionally aware device management bus address assignment.

BACKGROUND

A system may be comprised of multiple busses to connect a storage controller with multiple storage devices. A Peripheral Component Interconnect Express (PCIe) bus may be used to connect the storage device controller with the multiple storage devices, such as solid state drives (SSDs) to transfer read and write commands and data. The system may also include a System Management Bus (SMBus) providing simple two wire bus pairs between the storage device controller and each storage device for power management operations, communicate manufacturer information, temperature information, report errors, and return status. The storage device controller may also control other devices through the SMBus, such as fans and Light Emitting Diodes (LEDs) that signal states of the connected storage devices.

The storage device controller may be implemented in a baseboard management controller (BMC), which is typically implemented as a chip on the motherboard that monitors the temperature in the system resulting from central processing unit (CPU) and storage device operations. The BMC may use the SMBus to control the operation of fans to reduce the temperature of the connected storage devices and CPU. The BMC operates independently of the storage devices and the information they gather, including temperature and other attributes of operations.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
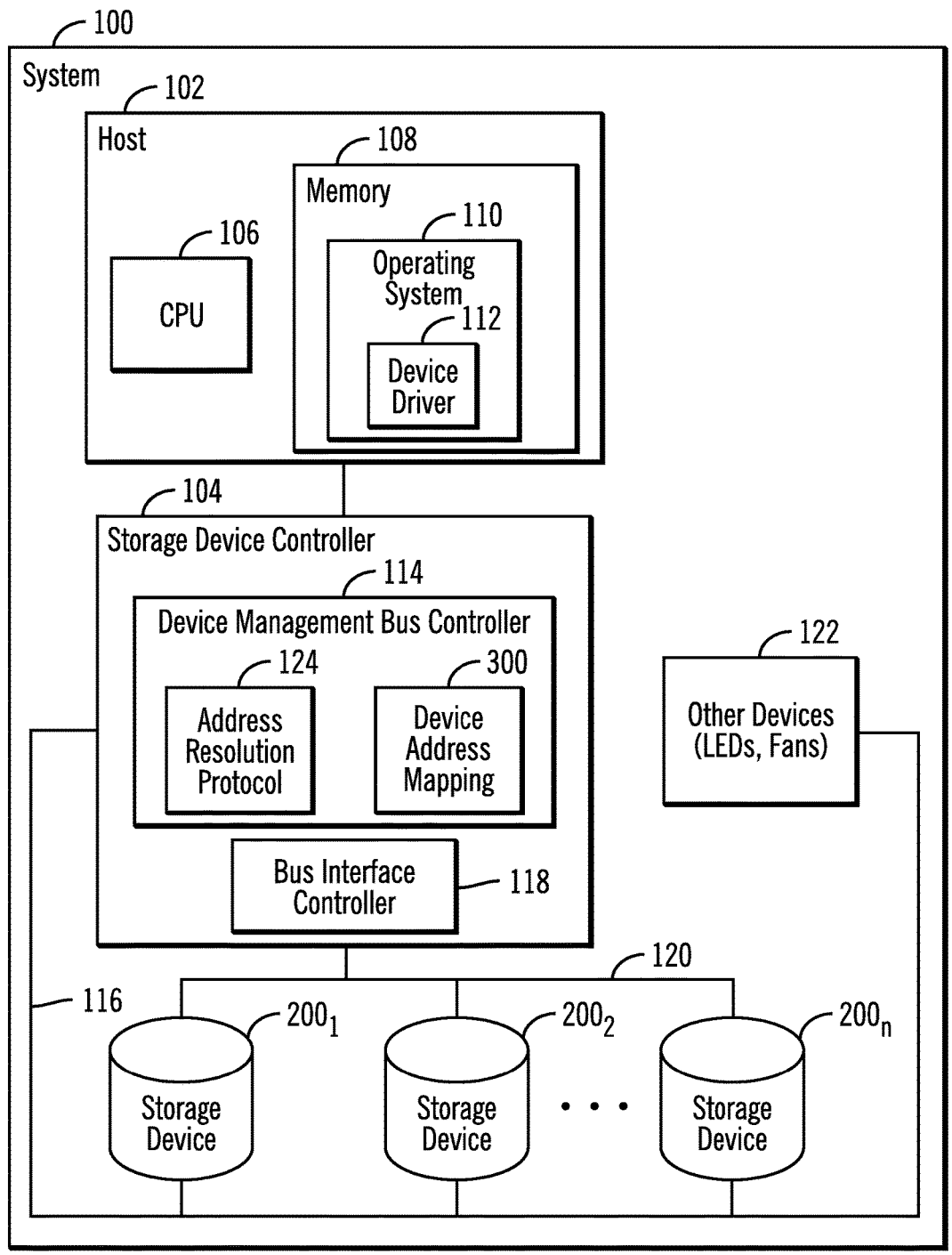
FIG. 1 illustrates an embodiment of a computing system.

The System Management Bus (SMBus) is a single ended simple two-wire bus that has an Address Resolution Protocol (ARP) for assigning a unique address to each device coupled to the SMBus. However, the current SMBus implementations are not well suited for topologies where devices like PCIe cards can be added or removed in one of multiple locations because the ARP has no mechanism to determine into which port the device was installed (no positional awareness). One prior solution to this problem is to add SMBus multiplexers or switches which can be individually enabled to provide a unique path to each port. However, certain implementations of the bus may want to eliminate all active components on the backplane for better field serviceability. Described embodiments seek to eliminate complications associated with placing muxes and LEDs on the backplane, and running separate SMBus clock and data to each port, and to have fewer signals routed on the backplane.

Described embodiments address these problems by locating a detected SMBus device and assigning it an address (corresponding to its position) so that SMBus messages may be used to control position related functions or check position related status. In described embodiments, each device address is associated with a physical location of the port on the SMBus that connects to the device.

Described embodiments utilize that one signal on the bus already has unique per-port mapping. This signal isolates the SMBus controller in only one port and makes it receptive to new address assignment from the host. In certain embodiments, the signal may make the storage devices receptive to new addresses by the signal causing the storage device to power cycle, reset the state machine, etc. The host can connect to the devices on shared bus lines to reduce routing congestion on the backplane yet talk to each port's installed device explicitly. Described embodiments seek to leverage signals and protocols already standardized for other purposes to reduce the implementation effort. In one implementation, the signal used to isolate the storage device on the bus may comprise the storage device's dedicated port for the SMBus reset signal, and the protocol to leverage is the SMBus ARP.

In one embodiment, all the ports that may have uninitialized devices except the one device of interest are reset and a Get Unique Identifier command is sent on the SMBus. The received identifier is then associated with the port of the detected storage device on which the reset signal was not asserted. Then SMBus resets sent to the different storage devices are released to keep the reset assertion as short as possible. The ARP Assign Address command is then used to initialize the device with that unique identifier to the SMBus address for that port. Per the ARP protocol, the storage device receiving the assigned address will not respond to future Get Unique Identifier requests unless reset. The logic may then check other ports for added or removed devices.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

FIG. 1 illustrates an embodiment of a system 100 having a host 102 and a storage device controller 104 managing access to one or more storage devices $200_1, 200_2 \ldots 200_n$. The host 102 includes a central processing unit (CPU) 106, which may comprise one or more processors each having one or more cores, and a host memory 108 including an operating system 110, a device driver 112 to interface with and send read and write requests, i.e., Input/Output (I/O) requests, to the controller 104 and storage devices $200_1, 200_2 \ldots 200_n$. The controller 104 includes a device management bus controller 114 to communicate with a device management bus 116, such as a System Management Bus (SMBus) or other device management busses known in the art, and a bus interface controller 118 to connect to another bus interface 120, such as a Peripheral Component Interconnect Express (PCIe) bus, used to communicate data and read and write commands to the storage devices $200_1$, $200_2 \ldots 200_n$. The device management bus 116 may also connected to other devices 122, such as light emitting diodes (LEDs) indicating a status of the storage device $200_1$, $200_2 \ldots 200_n$, e.g., healthy, error, etc., and fans next to the storage devices $200_1$, $200_2 \ldots 200_n$ to provide cooling. In alternative embodiments, the other devices 122 may connect to the controller 104 over lines separate from the device management bus 116.

The device management bus controller 114 may include an address resolution protocol unit 124 to assign non-conflicting addresses to the devices $200_1$, $200_2 \ldots 200_n$ and 122 on the device management bus 116 and a device address mapping 300 providing the addresses assigned to the devices on the device management bus 116.

The system 100 may include additional components, such as an antenna, keyboard, monitor, multi-media controller, wireless receiver, etc.

In one embodiment, the controller 104 may comprise a storage device controller, such as a Serial ATA (SATA) controller or other controller devices known in the art. The controller 104 may be implemented in a chipset external from the host 102 components, such as a Platform Controller Hub (PCH) or other chipset on the motherboard. Further the controller 104 components may be implemented in a single chipset or multiple chipsets on the system 100 motherboard.

The controller 104 may further comprise a baseboard management controller (BMC) that monitors the temperature in the system resulting from the host 102 and the storage device $200_1$, $200_2 \ldots 200_n$. The controller 104 may be implemented as an Application Specific Integrated Circuit (ASIC) or in a computational device having a processor executing code or firmware stored in memory.

The host memory 108 may comprise a suitable volatile or non-volatile memory device The storage devices $200_1$, $200_2 \ldots 200_n$ may comprise hard disk drives, solid state storage devices (SSDs) comprised of any memory device that comprise non-volatile memory. In one embodiment, the memory device is a block addressable memory device, such as those based on NAND or NOR technologies. A memory device may also include future generation nonvolatile devices, such as a three dimensional cross-point memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. The storage devices $200_1$, $200_2 \ldots 200_n$ may be configured in an array, such as a Just a Bunch of Disks (JBOD), Just a Bunch of Flash (JBOF) or Redundant Array of Independent Disk (RAID) arrays.

In certain embodiments, the devices $200_1$, $200_2 \ldots 200_n$ being accessed through the controller 104 comprise storage devices. In alternative embodiments, the devices $200_1$, $200_2 \ldots 200_n$ may comprise Input/Output devices other than a storage device.

Figure 2:
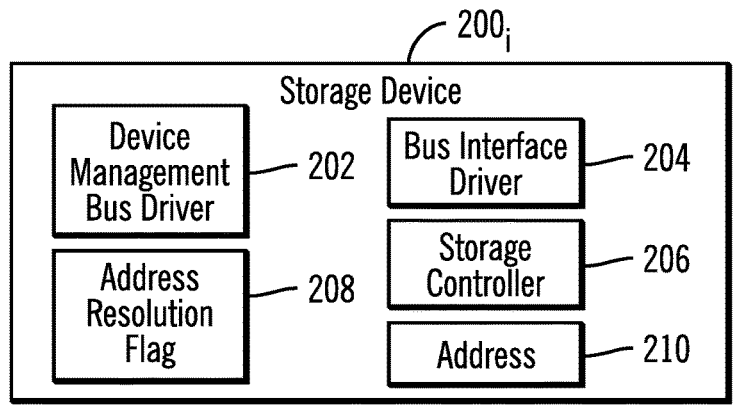
FIG. 2 illustrates an embodiment of a storage device.

FIG. 2 illustrates an embodiment of components in each of the storage devices $200_i$, and includes a device management bus driver 202 to communicate on the device management bus 116, e.g., SMBus, a bus interface driver 204 to communicate on the interface bus 120, e.g., PCIe bus, a storage controller 206 to manage I/O requests and other storage device $200_i$ operations, an address resolution flag 208 indicating whether an address was assigned to the storage device $202_i$ for the device management bus 116, and an address 210 if assigned by the address resolution protocol unit 124.

Figure 3:
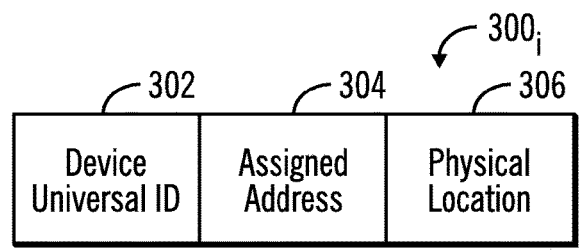
FIG. 3 illustrates an embodiment of an address mapping entry.

FIG. 3 illustrates an embodiment of an address mapping entry $300_i$ in the device address mapping 300 in the device management bus controller 114 for one of the devices $200_i$, and includes a unique identifier 302 of the device, a non-conflicting assigned address 304 used to communicate with the device on the device management bus 116, and a physical location 306 of the device 302. The physical location 306 may comprise a code that identifiers a region or area within the system 100, or a port or other device used to denote location.

The address mapping 300 may be cleared when the system 100 initializes, e.g., rebooted, started, power cycle event, etc.

The physical location 306 of a storage device $200_i$ may be used to determine which other devices 122 to activate with respect to a sensed condition for the storage device $200_i$. For instance, if an attribute of a storage device $200_i$ is determined over the device management bus 116, such as a temperature or error status, then the device management bus controller 114 may determine an action to take with respect to one of the other devices 122 for the sensed attribute by sending commands to control one of the other devices 122 that is located closest to the physical location 306 of the storage device 200i having the attribute. For instance, if the attribute comprises a temperature of the storage device $200_i$, then the device management bus controller 114 may control fans 122 closest to the physical location 306 of the storage device $200_i$ to increase or decrease cooling of the storage device $200_i$ based on the sensed temperature attribute. Alternatively, if the attribute comprises an error status, then the device management bus controller 114 may control light emitting diodes (LEDs) closest to the physical location 306 of the storage device $200_i$ to indicate the error status, such as health, having an error condition, etc.

Figure 4:
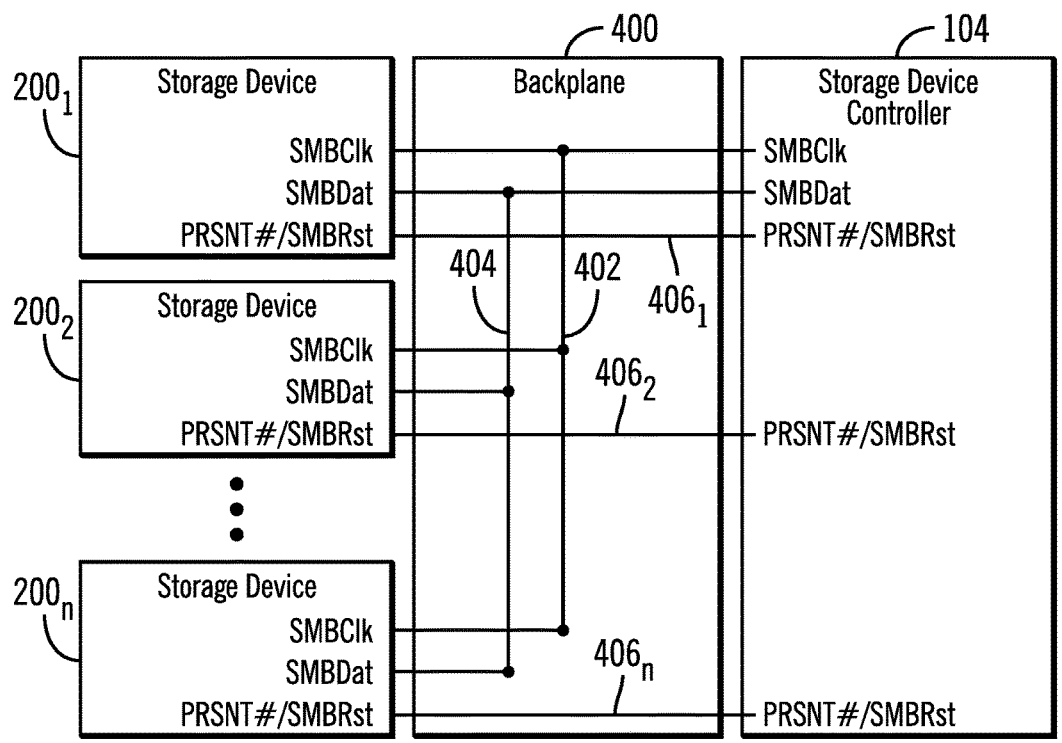
FIG. 4 illustrates one embodiment of the system of FIG. 1 including the backplane layout.

FIG. 4 illustrates an embodiment of further components of the system 100, including a backplane 400 having the device management bus 116 lines to connect the storage devices $200_1$, $200_2 \ldots 200_n$ to the controller 104. The backplane 400 may include a shared clock line 402 for the bus 116, such as the SMBClk line in the SMBus, and a shared data line 404 for the bus 116, such as the SMBdat line for an SMBus. Also each of the storage devices $200_1$, $200_2 \ldots 200_n$ may include one or more separate dedicated lines $406_1$, $406_2 \ldots 406_n$, respectively, on which certain management signals are asserted between the storage device $200_i$ and the controller 104. For instance, a storage device $200_i$ may assert a present signal (PRSNT# signal) on its dedicated line(s) $406_i$ when connected to the bus 116 and the storage device controller 104 may assert a reset signal (e.g., SMBRst for the SMBus) over a dedicated line $406_i$ to one storage device $200_i$ to reset that specific storage device $200_i$. The dedicated lines $406_1, 400_2 \ldots 400_n$ may each comprise separate lines to assert separate signals, such as one line for the present signal (PRSNT#) and another line for the reset signal (SMBRst). Alternatively, multiple signals may be asserted on one line of each dedicated line $406_1, 400_2 \ldots 400_n$. For instance, the PRSNT#/SMBRst# could be some other signal that is uniquely mapped per storage device.

Figure 5:
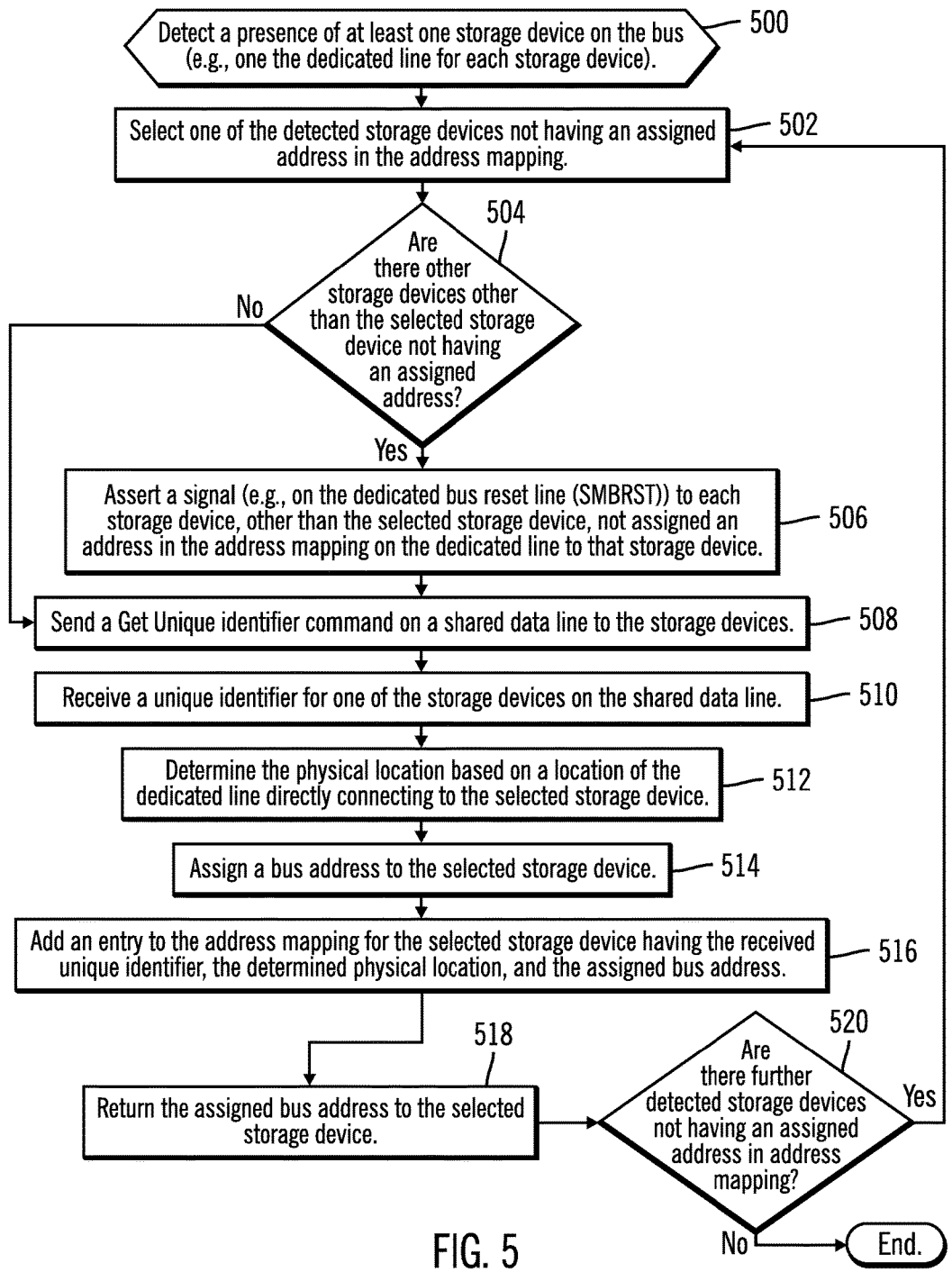
FIG. 5 illustrates an embodiment of operations for the device management bus controller to assign addresses to connected devices.

FIG. 5 illustrates an embodiment of operations performed by the address resolution protocol 124 or other component of the device management bus controller 114 to assign an address to a storage device $200_1, 200_2 \ldots 200_n$ detected on the device management bus 116. Upon detecting (at block 500) a presence of at least one storage device $200_1, 200_2 \ldots 200_n$ on the bus 116, which may be detected by the storage devices $200_1, 200_2 \ldots 200_n$ asserting a present signal on the dedicated line $406_i$ of the bus 116 for the storage device $200_i$, the address resolution protocol 124 selects (at block 502) one of the detected present storage devices $200_i$ not having an assigned address in the address mapping 300. If (at block 504) there are other storage devices $200_j$ other than the selected storage device $200_i$ not having an assigned address, then a signal is asserted (at block 506) on the dedicated lines $406_j$ for the storage devices $200_j$ other than the selected storage device $200_i$ to prevent those storage devices $200_j$ from responding to a Get Unique Identifier command. In one embodiment, the asserted signal to prevent the other storage devices not assigned an address from responding to the Get Unique Identifier command may comprise a reset signal, such as the SMBRst signal for SMBus implementations.

If (at block 506) the reset signal is asserted on the dedicated lines $406_j$ or if (from the no branch of block 504) there are no other present devices not having an assigned address 304, then the address resolution protocol 124 sends (at block 508) a Get Unique Identifier command on the shared data line 404 to the storage devices $200_1, 200_2 \ldots 200_n$. Upon receiving (at block 510) a unique identifier for the selected storage devices $200_i$ on the shared line 404, which comprises the selected storage device $200_i$ not having an assigned address and not having a reset signal asserted on its dedicated line $406_i$, the physical location for the selected storage device $200_i$ is determined (at block 512) based on a known physical location of a port for the dedicated line $406_i$ coupled to the selected storage device $200_i$. For instance, there may be a known physical location on the backplane 400 included in system management information of the controller 104 for the storage device $200_i$ that is coupled to the dedicated line 406i that connects to the port on which the controller 104 is communicating to the dedicated line $406_i$. The address resolution protocol 124 further assigns (at block 514) a non-conflicting bus address to the selected storage device $200_i$, to use on the device management bus 116. An entry $300_i$ is added (at block 516) to the address mapping 300 for the selected storage device $200_i$ having the received unique identifier 302, the assigned bus address 304, and the determined physical location 306. The assigned bus address 304 is returned (at block 518) to the selected storage device $200_i$ over the bus 116. If (at block 520) there are any detected storage devices $200_i$ not having an assigned address 304 in the address mapping 306, then control proceeds to block 502 to select another storage device $200_i$ to assign an address. If there are no further detected storage devices not having an assigned address, then control ends.

Figure 6:
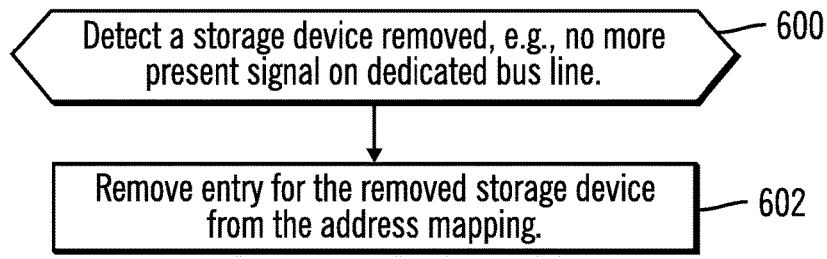
FIG. 6 illustrates an embodiment of operations for a removed storage device.

FIG. 6 illustrates an embodiment of operations performed by the address resolution protocol 124 or other component of the device management bus controller 114 when a storage device $200_i$ is removed or disconnected from the bus 116. Upon detecting (at block 600) that a storage device $200_i$ is disconnected from the bus 116, which may be detected when the present signal is no longer asserted on the dedicated line $406_i$ for the storage device $200_i$, then the entry $300_i$ for the detected removed storage device is removed (at block 602) from the address mapping 300, having the physical location 306 associated with the dedicated line $406_i$ on which the present signal is no longer detected, i.e., asserted.

Figure 7:
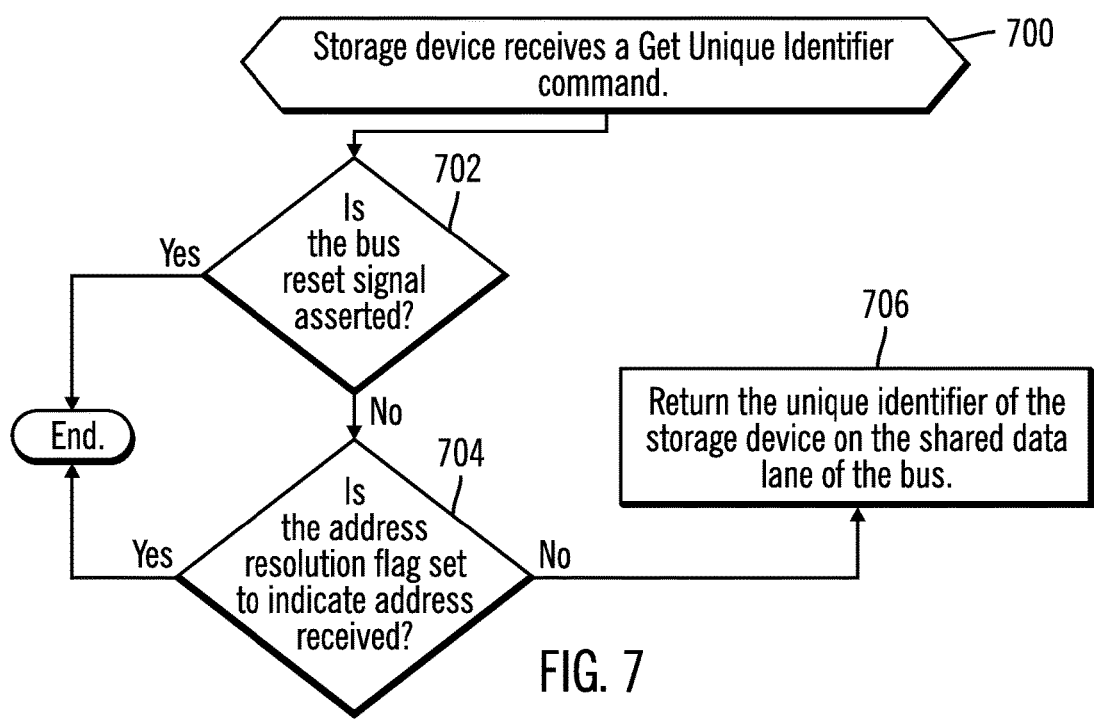
FIG. 7 illustrates an embodiment of operations for a storage device to process a Get Unique Identifier command.

FIG. 7 illustrates an embodiment of operations performed in a storage device $200_i$, such as in the device management bus driver 202 for the device management bus 116, to process a Get Unique Identifier command. Upon receiving (at block 700) a Get Unique Identifier command, if (at block 702) the bus reset signal is not asserted on the dedicated line $400_i$ for the storage device $200_i$, then a determination is made (at block 704) whether the address resolution flag 208 indicates that an address 210 was received. If the flag 208 indicates no address was received, then the storage device $200_i$ returns (at block 706) the unique identifier of the storage device $200_i$ on the shared data bus line 404 to the controller 104. If (at block 702) the bus reset signal is asserted or if (at block 704) the address resolution flag 208 indicates an address 210 was already received, then control ends without responding to the Get Unique Identifier command.

Figure 8:
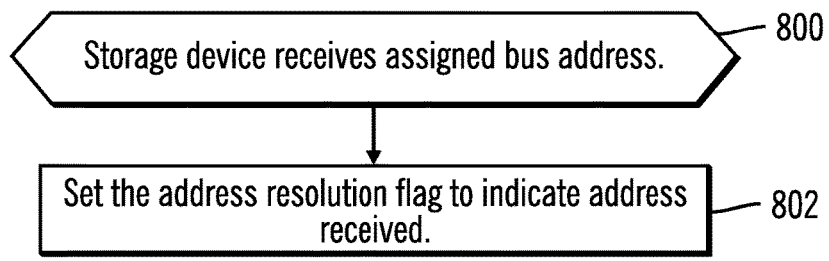
FIG. 8 illustrates an embodiment of operations for a storage device to receive an assigned bus address.

FIG. 8 illustrates operations performed in a storage device $200_i$, such as in the management bus driver 202 for the device management bus 116, to process a received assigned bus address for the bus 116. Upon receiving (at block 800) the assigned bus address, the address resolution flag 208 is set (at block 802) to indicate the address was received.

Following is a further description of an implementation when the device management bus 116 comprises a SMBus. When a storage device, e.g., $200_i$, is first plugged in or experiences an SMBus Reset, the storage device $200_i$ will default to industry standard SMBus addresses and clear its Address Resolution (AR) flag. Since this default address is the same address on all ports it is impossible for the host to talk to any particular device without conflicts. Per the SMBus 2.0 and 3.0 Specifications, only devices with AR flag, e.g., 208, clear respond to the Get UDID (Unique Device Identifier), e.g., get unique device identifier command. A successful Assign Address command will set that storage device $200_i$ internal AR flag 208. With certain described embodiments, only the one storage device $200_i$ at a time will respond to the Get UDID command because the other SMBus slots are either empty, held in reset, or already have assigned addresses. The slot that received the Get UDID command is known because of how the resets are configured.

In an alternative embodiment, empty slots may be reset at the same time as unconfirmed slots in the event that a storage device failed to assert a present signal on power-up or a storage device was added since this inner loop started. Upon power-up, the host or board management controller (BMC) or ARP master, e.g., address resolution protocol unit 124, resets its list of configured ports, e.g., address mapping 300. The ARP master waits for an interrupt trigger or polls the presence detect signals for ports that have changed status indicating a storage device has been inserted or removed. There could be some filtering of the presence detect signal to prevent false triggering as well as dynamic or preset delays to give new devices time to power up.

The ARP master then asserts reset on all ports that did not yet have an address assigned except the new one of interest. The ARP master sends a Get UDID command (defined by SMBus 2.0 and 3.0 Specifications) to fetch the attached storage device's unique identifier and then release the reset. This adds a requirement that during reset assertion, the SMBus device does not respond to ARP commands.

Then the ARP master uses the Assign Address command to assign this device an SMBus address, e.g., 210, that was correlated to its physical location. If there are multiple ARP capable devices with the same UDID they can all be assigned addresses without an additional reset. In such case, there are multiple entries $300_i$ in the device address mapping 300 for the address 304 and associated physical location 306. Assigning the address also sets the AR flag so that this drive will no longer respond to additional Get UDID commands per the SMBus specification. So this device no longer needs to be reset when other devices are added.

After all newly detected storage devices have their SMBus address assigned, the controller continues to watch for any new drives. A hot insert is detected by the same process as at power-on. If a storage device experiences its own reset for reasons not related to SMBus resets from a host, then the storage device reverts back to its default address and responds to Get UDID commands. This UDID may be detected instead of the port of interest and is compared against a list of configured devices. If the UDID is found then it is given its original address again and the ARP master performs another Get UDID for the port of interest.

If the ARP master detects that a device has been removed from a port it may remove the UDID from its list, e.g., 300, of configured ports. So that if the same storage device is plugged into another port it will not reassign the original address in a wrong port. After all changes in presence detect have been accounted for, then the controller may periodically, or as an error handling response to failed communications, send additional Get UDID commands without reset assertion and see if any of the SMBus devices have experienced a reset. If a drive with an assigned address does not respond to its addressed SMBus traffic with ACK, then the ARP master resets that SMBus socket and attempts to reassign its SMBus address.

The described operations of the controller 104 and storage devices $200_1$, $200_2$ . . . $200_n$ and their components, such as 114, 124, 118, 202, 204, 206, and other components, may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

EXAMPLES

The following examples pertain to further embodiments.

Example 1 is an apparatus in communication with a plurality of storage devices over a bus, comprising: a memory including an address mapping for the storage devices; and a bus controller to: detect a presence of a plurality of storage devices on the bus; select one of the storage devices detected on the bus; send a get identifier command on the bus to all of the storage devices that is only responded to by the selected storage device; receive a unique identifier from the selected storage device over the bus; assign an address for the selected storage device; and add an entry to the address mapping to indicate the unique identifier, the assigned address, and a physical location indicator for the selected storage device.

In Example 2, the subject matter of Examples 1 and 3-8 can optionally include that the bus controller is further to send the assigned address to the selected storage device over the bus to cause the selected storage device to set an address resolution flag to indicate that the address was received, wherein to set the address resolution flag to indicate that the address was received prevents the selected storage device from responding to a subsequent received get identifier command over the bus.

In Example 3, the subject matter of Examples 1, 2 and 4-8 can optionally include that the bus comprises a shared data lane connecting the apparatus to the storage devices and a dedicated lane to each of the storage devices connected to the bus, wherein the physical location indicator included in the entry in the address mapping is based on a location of the dedicated lane to the selected storage device.

In Example 4, the subject matter of Examples 1-3 and 5-8 can optionally include that the bus controller sends the get identifier command on the bus to only be acted upon by the selected storage device, wherein the bus controller is further to: assert a signal to each of the storage devices on the dedicated lane other than the selected storage device and that has not been assigned an address according to the address mapping, wherein the asserted signal blocks each of the storage devices that detect the asserted signal from responding to the get identifier command.

In Example 5, the subject matter of Examples 1-4 and 6-8 can optionally include that the asserted signal to each of the storage devices comprises a bus reset signal.

In Example 6, the subject matter of Examples 1-5 and 7-8 can optionally include a management controller to: receive information on an attribute of a sensed storage device of the storage devices connected on the bus; determine whether an action is required for the attribute with respect to one of a plurality of devices at different locations with respect to the storage devices; in response to a determination that the action is required for the attribute, determine a proximate device of the devices at a physical location closest to the physical location of the sensed storage device indicated in the entry for the sensed storage device in the address mapping; and send a command to the proximate device to perform the action.

In Example 7, the subject matter of Examples 1-6 and 8 can optionally include that the attribute comprises a temperature of the sensed storage device, wherein the proximate device comprise fans, and wherein the action comprises adjusting the fan based on the temperature.

In Example 8, the subject matter of Examples 1-7 can optionally include that the attribute comprises a device status, wherein the devices including the proximate device comprise light emitting diodes (LEDs) and wherein the action comprises activating one of the LEDs closest to the sensed storage device corresponding to the device status from the sensed storage device.

Example 9 is a system, comprising: a host; a storage device controller coupled to the host to receive Input/Output requests from the host; a plurality of storage devices; a device management bus to couple the storage device controller and the storage devices; a bus interface to couple the storage device controller and the storage devices, wherein the storage device controller sends I/O requests from the host to the storage devices over the bus interface; wherein the storage device controller includes: a memory including an address mapping for the storage devices; and a bus controller to: detect a presence of a plurality of storage devices on the device management bus; select one of the storage devices detected on the device management bus; send a get identifier command on the device management bus to all of the storage devices that is only responded to by the selected storage device; receive a unique identifier from the selected storage device over the device management bus; assign an address for the selected storage device; and add an entry to the address mapping to indicate the unique identifier, the assigned address, and a physical location indicator for the selected storage device.

In Example 10, the subject matter of Examples 9 and 11-14 can optionally include that the bus controller is further to send the assigned address to the selected storage device over the device management bus to cause the selected storage device to set an address resolution flag to indicate that the address was received, wherein to set the address resolution flag to indicate that the address was received prevents the selected storage device from responding to a subsequent received get identifier command over the device management bus.

In Example 11, the subject matter of Examples 9, 10 and 12-14 can optionally include that the device management bus comprises a shared data lane connecting the storage device controller to the storage devices and a dedicated lane to each of the storage devices connected to the device management bus, wherein the physical location indicator included in the entry in the address mapping is based on a location of the dedicated lane to the selected storage device.

In Example 12, the subject matter of Examples 9-11 and 13-14 can optionally include that the bus controller sends the get identifier command on the device management bus to only be acted upon by the selected storage device. The bus controller is further to: assert a signal to each of the storage devices on the dedicated lane other than the selected storage device and that has not been assigned an address according to the address mapping, wherein the asserted signal blocks each of the storage devices that detect the asserted signal from responding to the get identifier command.

In Example 13, the subject matter of Examples 9-12 and 14 can optionally include that the asserted signal sent to each of the storage devices comprises a bus reset signal.

In Example 14, the subject matter of Examples 9-13 can optionally include that a plurality of devices are coupled to the device management bus, wherein the storage device controller further includes a management controller to: receive information on an attribute of a sensed storage device of the storage devices connected on the device management bus; determine whether an action is required for the attribute with respect to one of the plurality of devices at different locations with respect to the storage devices; in response to a determination that the action is required for the attribute, determine a proximate device of the plurality of devices at a physical location closest to the physical location of the sensed storage device indicated in the entry for the sensed storage device in the address mapping; and send a command to the proximate device to perform the action.

Example 15 is a storage device coupled to a device management bus and a bus interface to a storage device controller, including: an address resolution flag; a device management bus driver to: receive a get unique identifier command from the storage device controller over the device management bus; determine whether a bus reset signal is asserted on the device management bus; determine whether the address resolution flag indicates that an address was received; and return a unique identifier of the storage device in response to a determination that the bus reset signal is not asserted and that the address resolution flag indicates a bus address was not received.

In Example 16, the subject matter of Examples 15 and 17 can optionally include that the device management bus driver is further to: receive an assigned bus address; and set the address resolution flag to indicate that an bus address for the device management bus was received.

In Example 17, the subject matter of Examples 15 and 16 can optionally include that the device management bus driver does not respond to the get unique identifier command in response to a determination that the bus reset signal is asserted and that the address resolution flag indicates a bus address was received.

Example 18 is a method for communicating with a plurality of storage devices over a bus, comprising: detecting a presence of a plurality of storage devices on the bus; selecting one of the storage devices detected on the bus; sending a get identifier command on the bus to all of the storage devices that is only responded to by the selected storage device; receiving a unique identifier from the selected storage device over the bus; assigning an address for the selected storage device; and adding an entry to the address mapping to indicate the unique identifier, the assigned address, and a physical location indicator for the selected storage device.

In Example 19, the subject matter of Examples 18 and 20-25 can optionally include sending the assigned address to the selected storage device over the bus to cause the selected storage device to set an address resolution flag to indicate that the address was received, wherein to set the address resolution flag to indicate that the address was received prevents the selected storage device from responding to a subsequent received get identifier command over the bus.

In Example 20, the subject matter of Examples 18, 19 and 21-25 can optionally include that the bus comprises a shared data lane connecting to the storage devices and a dedicated lane to each of the storage devices connected to the bus, wherein the physical location indicator included in the entry in the address mapping is based on a location of the dedicated lane to the selected storage device.

In Example 21, the subject matter of Examples 18-20 and 22-25 can optionally include that the get identifier command is sent on the bus to only be acted upon by the selected storage device, and further comprising: asserting a signal to each of the storage devices on the dedicated lane other than the selected storage device and that has not been assigned an address according to the address mapping, wherein the asserted signal blocks each of the storage devices that detect the asserted signal from responding to the get identifier command.

In Example 22, the subject matter of Examples 18-21 and 23-25 can optionally include that the asserted signal sent to each of the storage devices comprises a bus reset signal.

In Example 23, the subject matter of Examples 18-22 and 24-25 can optionally include receiving information on an attribute of a sensed storage device of the storage devices connected on the bus; determining whether an action is required for the attribute with respect to one of a plurality of devices at different locations with respect to the storage devices; in response to determining that the action is required for the attribute, determining a proximate device of the devices at a physical location closest to the physical location of the sensed storage device indicated in the entry for the sensed storage device in the address mapping; and sending a command to the proximate device to perform the action.

In Example 24, the subject matter of Examples 18-23 and 25 can optionally include that the attribute comprises a temperature of the sensed storage device, wherein the proximate device comprise fans, and wherein the action comprises adjusting the fan based on the temperature.

In Example 25, the subject matter of Examples 18-24 can optionally include that the attribute comprises a device status, wherein the devices including the proximate device comprise light emitting diodes (LEDs) and wherein the action comprises activating one of the LEDs closest to the sensed storage device corresponding to the device status from the sensed storage device.

Example 26 is an apparatus for communicating with a plurality of storage devices over a bus, comprising: means for detecting a presence of a plurality of storage devices on the bus; means for selecting one of the storage devices detected on the bus; means for sending a get identifier command on the bus to all of the storage devices that is only responded to by the selected storage device; means for receiving a unique identifier from the selected storage device over the bus; means for assigning an address for the selected storage device; and means for adding an entry to the address mapping to indicate the unique identifier, the assigned address, and a physical location indicator for the selected storage device.

Example 27 is an apparatus comprising means to perform a method as claimed in any preceding claim.

Example 28 is a machine-readable storage including machine-readable instructions, when executed, to implement a method or realize an apparatus as claimed in any preceding claim.

What is claimed:

1. An apparatus in communication with a plurality of storage devices over a bus, comprising:
   a memory including an address mapping for the storage devices; and
   a bus controller to:
      detect a presence of a plurality of storage devices on the bus, wherein the bus comprises a shared data lane connecting the apparatus to the storage devices and a dedicated lane to each of the storage devices connected to the bus;
      select one of the storage devices detected on the bus;
      send a get identifier command on the bus to all of the storage devices that is only responded to by the selected storage device;
      receive a unique identifier from the selected storage device over the bus;
      assign an address for the selected storage device; and
      add an entry to the address mapping to indicate the unique identifier, the assigned address, and a physical location indicator for the selected storage device based on a location of the dedicated lane to the selected storage device.

2. The apparatus of claim 1, wherein the bus controller is further to:
   send the assigned address to the selected storage device over the bus to cause the selected storage device to set an address resolution flag to indicate that the address was received, wherein to set the address resolution flag to indicate that the address was received prevents the selected storage device from responding to a subsequent received get identifier command over the bus.

3. The apparatus of claim 1, wherein the bus controller sends the get identifier command on the bus to only be acted upon by the selected storage device, wherein the bus controller is further to:
   assert a signal to each of the storage devices on the dedicated lane other than the selected storage device and that has not been assigned an address according to the address mapping, wherein the asserted signal blocks each of the storage devices that detect the asserted signal from responding to the get identifier command.

4. The apparatus of claim 3, wherein the asserted signal to each of the storage devices comprises a bus reset signal.

5. The apparatus of claim 1, further including a management controller to:
   receive information on an attribute of a sensed storage device of the storage devices connected on the bus;
   determine whether an action is required for the attribute with respect to one of a plurality of devices at different locations with respect to the storage devices;
   in response to a determination that the action is required for the attribute, determine a proximate device of the devices at a physical location closest to the physical location of the sensed storage device indicated in the entry for the sensed storage device in the address mapping; and
   send a command to the proximate device to perform the action.

6. The apparatus of claim 5, wherein the attribute comprises a temperature of the sensed storage device, wherein the proximate device comprises fans, and wherein the action comprises adjusting the fan based on the temperature.

7. The apparatus of claim 5, wherein the attribute comprises a device status, wherein the devices including the proximate device comprise light emitting diodes (LEDs) and wherein the action comprises activating one of the LEDs closest to the sensed storage device corresponding to the device status from the sensed storage device.

8. A system, comprising:
a host;
a storage device controller coupled to the host to receive Input/Output requests from the host;
a plurality of storage devices;
a device management bus comprising a shared data lane connecting the storage device controller to the storage devices and a dedicated lane to each of the storage devices connected to the device management bus;
a bus interface to couple the storage device controller and the storage devices, wherein the storage device controller sends I/O requests from the host to the storage devices over the bus interface;
wherein the storage device controller includes:
a memory including an address mapping for the storage devices; and
a bus controller to:
detect a presence of a plurality of storage devices on the device management bus;
select one of the storage devices detected on the device management bus;
send a get identifier command on the device management bus to all of the storage devices that is only responded to by the selected storage device;
receive a unique identifier from the selected storage device over the device management bus;
assign an address for the selected storage device; and
add an entry to the address mapping to indicate the unique identifier, the assigned address, and a physical location indicator for the selected storage device based on a location of the dedicated lane to the selected storage device.

9. The system of claim 8, wherein the bus controller is further to:
send the assigned address to the selected storage device over the device management bus to cause the selected storage device to set an address resolution flag to indicate that the address was received, wherein to set the address resolution flag to indicate that the address was received prevents the selected storage device from responding to a subsequent received get identifier command over the device management bus.

10. The system of claim 8, wherein the bus controller sends the get identifier command on the device management bus to only be acted upon by the selected storage device, wherein the bus controller is further to:
assert a signal to each of the storage devices on the dedicated lane other than the selected storage device and that has not been assigned an address according to the address mapping, wherein the asserted signal blocks each of the storage devices that detect the asserted signal from responding to the get identifier command.

11. The system of claim 10, wherein the asserted signal sent to each of the storage devices comprises a bus reset signal.

12. The system of claim 8, further comprising:
a plurality of devices coupled to the device management bus,
wherein the storage device controller further includes a management controller to:
receive information on an attribute of a sensed storage device of the storage devices connected on the device management bus;
determine whether an action is required for the attribute with respect to one of the plurality of devices at different locations with respect to the storage devices;
in response to a determination that the action is required for the attribute, determine a proximate device of the plurality of devices at a physical location closest to the physical location of the sensed storage device indicated in the entry for the sensed storage device in the address mapping; and
send a command to the proximate device to perform the action.

13. A storage device coupled to a device management bus and a bus interface to a storage device controller, including:
an address resolution flag;
a device management bus driver to:
receive a get unique identifier command from the storage device controller over the device management bus;
determine whether a bus reset signal is asserted on the device management bus;
determine whether the address resolution flag indicates that an address was received; and
return a unique identifier of the storage device in response to a determination that the bus reset signal is not asserted and that the address resolution flag indicates a bus address was not received.

14. The storage device of claim 13, wherein the device management bus driver is further to:
receive an assigned bus address; and
set the address resolution flag to indicate that an bus address for the device management bus was received.

15. The storage device of claim 13, wherein the device management bus driver does not respond to the get unique identifier command in response to a determination that the bus reset signal is asserted and that the address resolution flag indicates a bus address was received.

16. A method for communicating with a plurality of storage devices over a bus, comprising:
detecting a presence of a plurality of storage devices on the bus, wherein the bus comprises a shared data lane connecting to the storage devices and a dedicated lane to each of the storage devices connected to the bus;
selecting one of the storage devices detected on the bus;
sending a get identifier command on the bus to all of the storage devices that is only responded to by the selected storage device;
receiving a unique identifier from the selected storage device over the bus;
assigning an address for the selected storage device; and
adding an entry to the address mapping to indicate the unique identifier, the assigned address, and a physical location indicator for the selected storage device based on a location of the dedicated lane to the selected storage device.

17. The method of claim 16, further comprising:
sending the assigned address to the selected storage device over the bus to cause the selected storage device to set an address resolution flag to indicate that the address was received, wherein to set the address resolution flag to indicate that the address was received prevents the selected storage device from responding to a subsequent received get identifier command over the bus.

18. The method of claim 16, wherein the get identifier command is sent on the bus to only be acted upon by the selected storage device, further comprising:

asserting a signal to each of the storage devices on the dedicated lane other than the selected storage device and that has not been assigned an address according to the address mapping, wherein the asserted signal blocks each of the storage devices that detect the asserted signal from responding to the get identifier command.

19. The method of claim 18, wherein the asserted signal sent to each of the storage devices comprises a bus reset signal.

20. The method of claim 16, further comprising:
receiving information on an attribute of a sensed storage device of the storage devices connected on the bus;
determining whether an action is required for the attribute with respect to one of a plurality of devices at different locations with respect to the storage devices;
in response to determining that the action is required for the attribute, determining a proximate device of the devices at a physical location closest to the physical location of the sensed storage device indicated in the entry for the sensed storage device in the address mapping; and
sending a command to the proximate device to perform the action.

21. The method of claim 20, wherein the attribute comprises a temperature of the sensed storage device, wherein the proximate device comprises fans, and wherein the action comprises adjusting the fan based on the temperature.

22. The method of claim 20, wherein the attribute comprises a device status, wherein the devices including the proximate device comprise light emitting diodes (LEDs) and wherein the action comprises activating one of the LEDs closest to the sensed storage device corresponding to the device status from the sensed storage device.

* * * * *